(12) United States Patent
Ohishi et al.

(10) Patent No.: US 7,325,886 B2
(45) Date of Patent: Feb. 5, 2008

(54) VEHICULAR BRAKE CONTROL SYSTEM

(75) Inventors: Masayoshi Ohishi, Kariya (JP);
Masatoshi Ohta, Kariya (JP);
Masanobu Yamaguchi, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 221 days.

(21) Appl. No.: 11/208,625

(22) Filed: Aug. 23, 2005

(65) Prior Publication Data

US 2006/0055233 A1 Mar. 16, 2006

(30) Foreign Application Priority Data

Sep. 14, 2004 (JP) ............................. 2004-266638

(51) Int. Cl.
*B60T 8/24* (2006.01)

(52) U.S. Cl. ............................. 303/139; 303/3; 303/10; 303/11; 303/15; 303/119.1; 303/113.2; 303/116.1

(58) Field of Classification Search ................ 303/139, 303/3, 10, 11, 15, 119.1, 119.2, 199, 113.2, 303/113.1, 116.1, 116.4

See application file for complete search history.

(56) References Cited

U.S. PATENT DOCUMENTS

| | | | |
|---|---|---|---|
| 6,361,126 B1* | 3/2002 | Pueschel et al. | 303/114.3 |
| 2001/0005100 A1* | 6/2001 | Kamiya | 303/5 |
| 2004/0183373 A1* | 9/2004 | Yonemura et al. | 303/191 |
| 2005/0225168 A1* | 10/2005 | Nakamura et al. | 303/119.2 |

FOREIGN PATENT DOCUMENTS

JP B2-2900542 3/1999

* cited by examiner

*Primary Examiner*—Melanie Torres
(74) *Attorney, Agent, or Firm*—Posz Law Group, PLC

(57) ABSTRACT

In a vehicular brake control system in which pressure upstream of a plurality of pressure increase control valves is variable, a brake control ECU sets a value of a current supplied to a solenoid coil in each of the pressure increase control valves in accordance with a physical quantity corresponding to a brake fluid pressure upstream of the pressure increase control valves, e.g., in accordance with a master cylinder pressure detected by a pressure sensor and an instruction current value for differential pressure control valves.

6 Claims, 5 Drawing Sheets

VEHICULAR BRAKE CONTROL SYSTEM

CROSS REFERENCE TO RELATED APPLICATION

This application is based upon and claims the benefit of Japanese Patent Application No. 2004-266638 filed on Sep. 14, 2004, the content of which are incorporated herein by reference.

FIELD OF THE INVENTION

The present invention relates to a vehicular brake control system provided with an actuator structured so as to be able to execute traction control (hereinafter referred to as "TCS control") or ABS control.

BACKGROUND OF THE INVENTION

Conventionally during TCS control in vehicular brake control systems, the non-driven wheels are not subject to the TCS control which generates braking force so brake fluid pressure is not applied to the wheel cylinders (hereinafter, simply referred to as "W/C" or "W/Cs") of those wheels. More specifically, by closing pressure increase control valves (normally open valves) provided in a brake conduit which connects a master cylinder (hereinafter, simply referred to as "M/C") to the W/Cs corresponding to the non-driven wheels, the brake fluid pressure is prevented from being applied to those W/Cs.

Further, by closing the pressure increase control valves provided in the brake conduits which connect the M/C to the W/Cs corresponding to the wheels for which the pressure is to be decreased or maintained, the brake fluid pressure applied to the W/Cs can be prevented from increasing when decreasing or maintaining the pressure, just as when the pressure is decreased or maintained during ABS control (see publication of Japanese Patent No. 2900542, for example).

Thus, the pressure increase control valves which control brake fluid pressure applied to the W/Cs of the non-driven wheels are closed during TCS control, and the pressure increase control valves which control brake fluid pressure applied to the W/Cs of the vehicle wheels for which the pressure is to be decreased or maintained are also closed when the pressure is to be decreased or maintained during ABS control. In order to close the pressure increase control valves at this time, a current value of the current flowing to the pressure increase control valves is set to a large value which enables the flow of brake fluid pressure to be reliably stopped by the pressure increase control valves, regardless of the brake fluid pressure upstream and downstream of the pressure increase control valves, e.g., regardless of the differential pressure between the pressure upstream of the pressure increase control valves and the pressure downstream of the pressure increase control valves.

Since the current value of the current flowing to the pressure increase control valves is primarily determined to be a large value, an unnecessary larger current is supplied to solenoid coils of the pressure increase control valves and an IC in an ECU which supplies the current that is supplied to the solenoid coils. Therefore, more electricity than is necessary is consumed. Accordingly, excess heat is generated by the solenoid coils and the IC in the ECU.

SUMMARY OF THE INVENTION

In view of the foregoing problems, the present invention provides a vehicular brake control system in which unnecessary power consumption can be reduced.

A first aspect of the present invention relates to a vehicular brake control system in which a pressure upstream of a plurality of pressure increase control valves is variable, in which a control portion obtains a physical quantity corresponding to a brake fluid pressure upstream of the plurality of pressure increase control valves, and changes a value of the current flowing to a solenoid coil provided in each of the plurality of pressure increase control valves according to this physical quantity.

Accordingly, it is possible to inhibit the value of the current flowing to the solenoid coil provided in each of the plurality of pressure increase control valves from becoming a value that is larger than a necessary value, whereby the amount of current consumption can be reduced. Also, because unnecessary current consumption can be reduced in this way, excess heat generated by the solenoid coil and an IC in the control portion can be controlled.

More specifically, the control portion reduces the value of the current flowing to the solenoid coil provided in each of the plurality of pressure increase control valves as the physical quantity becomes smaller.

According to a second aspect of the present invention, the control portion supplies a current to a motor and the solenoid coils of the differential pressure control valves during TCS control so as to create a differential pressure between the brake fluid pressure on the master cylinder side and the brake fluid pressure on the wheel cylinder side. At the same time, the control portion suppresses the driving force by driving the pumps and applying brake fluid pressure to the wheel cylinders among the plurality of wheel cylinders that correspond to driven wheels. Further, during this TCS control, the control portion sets, according to an instruction current value indicating a value of the current supplied to the differential pressure control valves, a value of the current supplied to the solenoid coils of the pressure increase control valves, from among the plurality of pressure increase control valves, which are used to control the brake fluid pressure of the plurality of wheel cylinders corresponding to non-driven wheels.

During TCS control, the pressure increase control valves among the plurality of pressure increase control valves that are used to control the brake fluid pressure of the plurality of wheel cylinders corresponding to the non-driven wheels are closed. If at this time the value of the current supplied to the pressure increase control valves corresponding to the non-driven wheels is made to equal a value corresponding to the instruction current value of the differential pressure control valves, the same effects obtained with the first aspect of the present invention can be obtained.

In this case, the control portion preferably sets the value of the current supplied to the solenoid coils in accordance with a time lag in the brake fluid pressure increase generated by the pump.

Accordingly, by setting the value of the current supplied to the solenoid coils according to the time lag in the brake fluid pressure increase generated by the pump, it is possible to suppress still further unnecessary current consumption, thereby further enhancing the effects described above.

More specifically, the value of the current supplied to the solenoid coils need simply be set lower during the duration of the time lag in the brake fluid pressure increase generated by the pump than after complete elapse of the duration.

Further, a pressure sensor may be provided for detecting the brake fluid pressure upstream of the plurality of pressure increase control valves. In this case, during ABS control, the control portion may control the brake fluid pressure applied to the wheel cylinders of the wheels to be controlled by driving the plurality of pressure increase control valves and the plurality of pressure decrease control valves corresponding to the wheel cylinders, from among the plurality of wheel cylinders, of the wheels to be controlled. Also, when the pressure is to be decreased or maintained during ABS control, the control portion may set the value of the current supplied to the solenoid coils of the pressure increase control valves corresponding to the wheel cylinders of the wheels to be controlled in accordance with a detection result from the pressure sensor.

Even when the pressure is to be decreased or maintained during ABS control in this manner, the pressure increase control valves among the plurality of pressure increase control valves that are used to control the brake fluid pressure of the plurality of wheel cylinders corresponding to the wheels to be controlled are closed. By making the value of the current supplied to the pressure increase control valves corresponding to the wheels to be controlled equal to a value in accordance with the detection result from the pressure sensor, the same effects obtained by the first aspect of the present invention can be obtained.

More specifically, the value of the current supplied to the solenoid coils need simply be set to be lower as the pressure detected by the pressure sensor becomes lower.

Moreover, the value of the current supplied to the solenoid coils may also be adjusted by supplying a current of a fixed value to the solenoid coils and varying the average value of the total current value per unit time by performing duty control for the time for which that current is supplied.

In this way the value of the current supplied to the solenoid coils can also be adjusted by duty control. Although performing this kind of duty control may produce duty modulation noise, this duty modulation noise can be reduced by adjusting the value of the current supplied to the solenoid coils.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
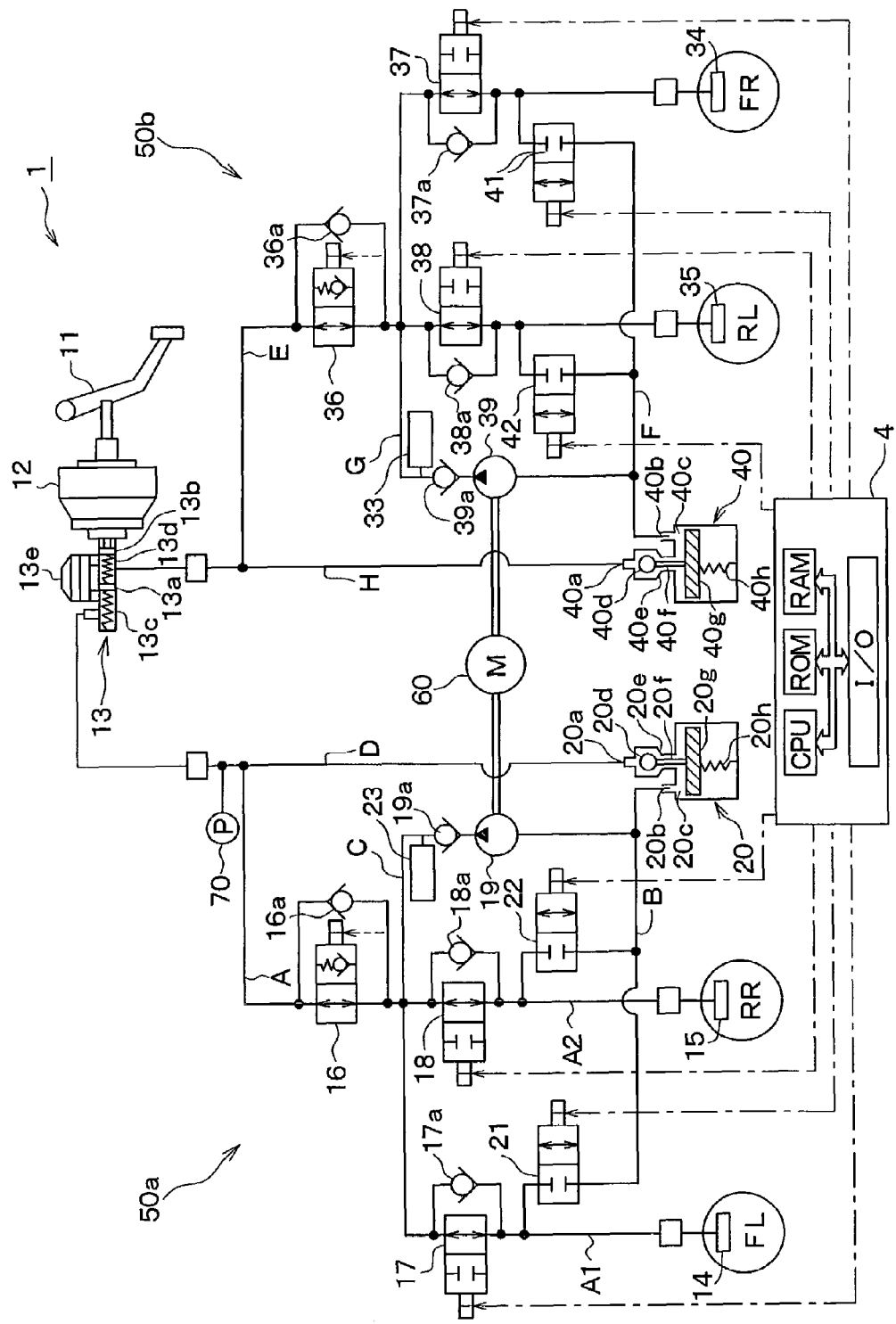
FIG. 1 is a block diagram of a vehicular brake control system according to a first embodiment of the present invention.

The present invention will be described further with reference to various embodiments in the drawings.

First Embodiment

A first embodiment of the present invention will hereinafter be described with reference to the appended drawings. FIG. 1 shows the entire structure of a vehicular brake control system 1 to which a first embodiment of the present invention has been applied. This embodiment describes a case in which the vehicular brake control system 1 has been mounted in a front wheel drive vehicle. Alternatively, however, the vehicular brake control system 1 may also be mounted in a rear wheel drive vehicle.

The structure of the vehicular brake control system 1 according to this embodiment will hereinafter be described with reference to FIG. 1.

A brake pedal 11 serving as a brake operating member which is depressed by a driver to apply braking force to the vehicle is connected to an M/C 13 and a booster 12 which serves as a brake fluid pressure generating source. When the driver depresses the brake pedal 11, the depression force is multiplied by the booster 12 and pushes against master pistons 13a and 13b arranged in the M/C 13. Accordingly, the same M/C pressure is generated in a primary chamber 13c and a secondary chamber 13d divided by the master pistons 13a and 13b.

The M/C 13 includes a master reservoir 13e which has passages that communicate it to the primary chamber 13c and the secondary chamber 13d respectively. The master reservoir 13e supplies brake fluid to the M/C 13 through these passages and stores excess brake fluid in the M/C 13. Each of the passages is formed with a diameter that is much smaller than the diameter of the main brake conduits extending from the primary chamber 13c and the secondary chamber 13d, such that an orifice effect is generated when brake fluid flows from the side of the primary chamber 13c and the secondary chamber 13d of the M/C 13 to the master reservoir 13e.

The M/C pressure generated in the M/C 13 is transmitted to the W/Cs 14 and 15 through a first brake piping system 50a and to the W/Cs 34 and 35 through a second brake piping system 50b. The first brake piping system 50a controls the brake fluid pressure applied to the front left wheel FL and the right rear wheel RR, while the second brake piping system 50b controls the brake fluid pressure applied to the right front wheel FR and the rear left wheel RL. That is, the two brake piping systems, i.e., the first and second brake piping systems 50a and 50b, form a diagonal line system.

Hereinafter, the first and second brake piping systems 50a and 50b will be described. However, because the first brake piping system 50a and the second brake piping system 50b are substantially the same, only the first brake piping system 50a will be described here. That is, the second brake piping system 50b can be understood by referring to the first brake piping system 50a, so a description thereof will be omitted here.

The first system 50a is provided with a brake conduit A which serves as a main brake conduit that transmits the M/C pressure to the W/C 14 provided in the front left wheel FL and the W/C 15 provided in the rear right wheel RR. W/C pressure is generated in each of the W/Cs 14 and 15 through this brake conduit A.

Also, a first differential pressure control valve 16 is provided in the brake conduit A. This first differential pressure control valve 16 is an electromagnetic valve that can be controlled into two positions, namely, an open position and a differential pressure position. The first differential pressure control valve 16 is in the open position during normal braking and switches to the differential pressure position to create a differential pressure when electricity is supplied to the solenoid coil. When the first differential pressure control valve 16 is in the differential pressure position, i.e., the position which creates a differential pressure, brake fluid is allowed to flow from the W/C 14 and 15 side to the M/C 13 side only when the brake fluid pressure on the W/C 14 and 15 sides is equal to, or greater than, a predetermined M/C pressure. Therefore, during normal operation, the brake fluid pressure on the W/C 14 and 15 sides is maintained so as not to become equal to, or greater than, a predetermined pressure greater than the pressure on the M/C 13 side in order to protect the brake conduits.

Also, the brake conduit A branches into two brake conduits A1 and A2 downstream of the first differential pressure control valve 16 on the W/C 14 and 15 sides. In one brake conduit A1 is provided a first pressure increase control valve 17 which controls a pressure increase in the brake fluid pressure to the W/C 14. In the other brake conduit A2 is provided a second pressure increase control valve 18 which controls a pressure increase in the brake fluid pressure to the W/C 15.

The first and second pressure increase control valves 17 and 18 are electromagnetic valves which can be set in two positions, i.e., opened status and closed status. When the first and second pressure increase control valves 17 and 18 are controlled so as to be opened status, M/C pressure or brake fluid pressure generated by the discharge of brake fluid from a pump 19, to be described later, is able to be applied to the W/Cs 14 and 15.

During normal braking performed by the driver operating the brake pedal 11, the first differential pressure control valve 16 and the first and second pressure increase control valves 17 and 18 are normally controlled to the opened status.

Further, a check valve 16a is provided in parallel with the first differential pressure control valve 16, a check valve 17a is provided in parallel with the first pressure increase control valve 17, and a check valve 18a is provided in parallel with the second pressure increase control valve 18. The check valve 16a of the first differential pressure control valve 16 is provided to allow the M/C pressure to be transmitted to the W/C 14 and 15 in a case where the driver depresses the brake pedal 11 when the first differential pressure control valve 16 is in the differential pressure position. Also, the check valves 17a and 18a of the pressure increase control valves 17 and 18, respectively, are provided such that, when the driver releases the brake pedal 11 while the pressure increase control valves 17 and 18 are controlled to the closed status during ABS control, in particular, the W/C pressure of the front left wheel FL and the right rear wheel RR can be reduced in response to that release operation.

A first pressure decrease control valve 21 and a second pressure decrease control valve 22, which are both two-position electromagnetic valves that can be controlled to an opened status or a closed status, are arranged in a brake conduit B which serves as a pressure decrease conduit that connects the reservoir 20 to the brake conduit A between the first pressure increase control valve 17 and the W/C 14, as well as to the brake conduit A between the second pressure increase control valve 18 and the W/C 15. The first and second pressure decrease control valves 21 and 22 are normally closed during normal braking.

A brake conduit C which serves as a recirculation conduit is arranged so as to connect the reservoir 20 to the brake conduit A acting as the main brake conduit. A self-suction pump 19 which is driven by the motor 60 is provided in the brake conduit C to draw up brake fluid from the reservoir 20 and discharge it to the M/C 13 side or the W/C 14 and 15 sides.

A check valve 19a is provided on a discharge port side of the pump 19 so that high pressure brake fluid is not applied to the pump 19. Also, a fixed displacement damper 23 is arranged on the discharge side of the pump 19 in the brake conduit C in order to reduce the pulsation of the brake fluid discharged by the pump 19.

A brake conduit D is also provided as an auxiliary brake conduit which connects the M/C 13 with the reservoir 20. By sucking brake fluid up with the pump 19 from the M/C 13 through this brake conduit D and discharging it to the brake conduit A, the brake fluid can be supplied to the W/C 14 and 15 side during TCS control and ABS control and the like, thereby enabling the W/C pressure of the wheel to be controlled to increase.

The reservoir 20 has a reservoir hole 20a and a reservoir hole 20b. The reservoir hole 20a is connected to the brake conduit D and is used to receive brake fluid from the M/C 13 side. The reservoir hole 20b is connected to the brake conduits B and C and is used to receive brake fluid that escapes from the W/Cs 14 and 15 as well as to supply brake fluid to the suction port side of the pump 19. Both the reservoir hole 20a and the reservoir hole 20b are connected to a reservoir chamber 20c. A ball valve 20d is provided to the inside of the reservoir hole 20a. A rod 20f, which has a predetermined stroke for moving the ball valve 20d up and down, is provided separately in the ball valve 20d.

Further, a piston 20g and a spring 20h are provided in the reservoir chamber 20c. The piston 20g is connected to the rod 20f. The spring 20h pushes this piston 20g toward the ball valve 20d side and thus generates force to eject the brake fluid from the reservoir chamber 20c.

The reservoir 20 of the foregoing structure is designed such that, when a predetermined amount of brake fluid is stored in the reservoir 20, the ball valve 20d is forced to sit against a valve seat 20e so that brake fluid can not flow into the reservoir 20. Accordingly, it is not possible for an amount of brake fluid that exceeds the suction capability of the pump 19 to flow into the reservoir chamber 20c, so high pressure is not applied to the suction port side of the pump 19.

Also, a pressure sensor 70 is provided between the M/C 13 and the first differential pressure control valve 16 in the brake conduit A. This pressure sensor 70 enables the M/C pressure generated in the M/C 13 to be detected.

Meanwhile, as described above, the second brake piping system 50b has generally the same structure as the first brake piping system 50a. That is, the first differential pressure control valve 16 corresponds to a second differential pressure control valve 36. The first and second pressure increase control valves 17 and 18 correspond to third and fourth pressure increase control valves 37 and 38, respectively. The first and second pressure decrease control valves 21 and 22 correspond to third and fourth pressure decrease control valves 41 and 42, respectively. The reservoir 20 corresponds to a reservoir 40, and the pump 19 corresponds to a pump 39. Also, the brake conduit A corresponds to a brake conduit E, the brake conduit B corresponds to a brake conduit F, the brake conduit C corresponds to a brake conduit G, and the brake conduit D corresponds to a brake conduit H. In this way, all of the elements described above together form the hydraulic brake piping system of the vehicular brake control system 1.

Moreover, a brake control ECU 4 serving as a control portion is provided in the vehicular brake control system 1. This brake control ECU 4 is a known microcomputer which includes a CPU, ROM, RAM, I/O, and the like. The brake control ECU 4 executes processing, e.g., various calculations, according to programs stored in the ROM, for example.

The voltage applied to the motor 60 is controlled based on electrical signals from the brake control ECU 4 to drive the pumps 19 and 39 and the various control valves 16 to 18, 21, 22, 36 to 38, 41, and 42 of a brake piping system structured as described above. Accordingly, the W/C pressure generated in each W/C 14, 15, 34, and 35 is able to be controlled.

This kind of vehicular brake control system 1 performs basically the same brake control as is performed by the related art. That is, during normal braking, the control valves are in the positions shown in FIG. 1. When M/C pressure is generated according to a depression amount of the brake pedal 11, that M/C pressure is transmitted to each W/C 14, 15, 34, and 35 such that braking force is generated in each wheel.

Then during TCS control, the first and second differential pressure control valves 16 and 36 are placed in the differential pressure position and the motor 60 is energized in order to adjust the braking force of the wheels that are to be controlled. Accordingly, with the M/C 13 serving as the brake fluid supply source, the pumps 19 and 39 are operated to suck up and discharge brake fluid such that the pressure in the W/Cs 14, 15, 34, and 35 of the wheels to be controlled is automatically increased via the brake conduits C and G and A and E, thereby generating braking force. At this time, those control valves among the first to the fourth control valves 17, 18, 37, and 38 that correspond to the non-driven wheels are closed such that brake fluid pressure is not applied to those wheel cylinders among the W/Cs 14, 15, 34, and 35 that correspond to the non-driven wheels. For example, as in this embodiment, when the vehicular brake control system 1 is applied to a front wheel drive vehicle, the second and fourth pressure increase control valves 18 and 38 which correspond to the W/Cs 15 and 35 of the rear right and left wheels RL and RR are closed.

Moreover, during ABS control as well, those pressure increase control valves among the first to the fourth pressure increase control valves 17, 18, 37, and 38 that correspond to the wheels to be controlled are closed when the pressure is to be decreased or maintained. Accordingly, the brake fluid pressure applied to the W/Cs 14, 15, 34, and 35 is kept from increasing.

These brake controls themselves are the same as the brake controls of the related art so the details thereof will be omitted here. Therefore, only the characteristic parts of the vehicular brake control system 1 according to this embodiment will hereinafter be described.

As described above, during TCS control, those control valves, from among the first to the fourth control valves 17, 18, 37, and 38, which correspond to the non-driven wheels are closed such that brake fluid pressure is not applied to those wheel cylinders, from among the W/C 14, 15, 34, and 35, which correspond to the non-driven wheels.

The vehicular brake control system 1 according to this embodiment controls the amount of electricity supplied to the solenoids of the first to the fourth control valves 17, 18, 37, and 38 corresponding to the non-driven wheels, which are closed while the TCS control is being executed.

Also, as described above, during ABS control as well, those pressure increase control valves, from among the first to the fourth pressure increase control valves 17, 18, 37, and 38 which correspond to the wheels to be controlled are closed when the pressure is to be decreased or maintained.

The vehicular brake control system 1 according to this embodiment also controls the amount of electricity supplied to the solenoids of the first to the fourth control valves 17, 18, 37, and 38 which are closed when the pressure is to be decreased or maintained due to ABS control.

Figure 2:
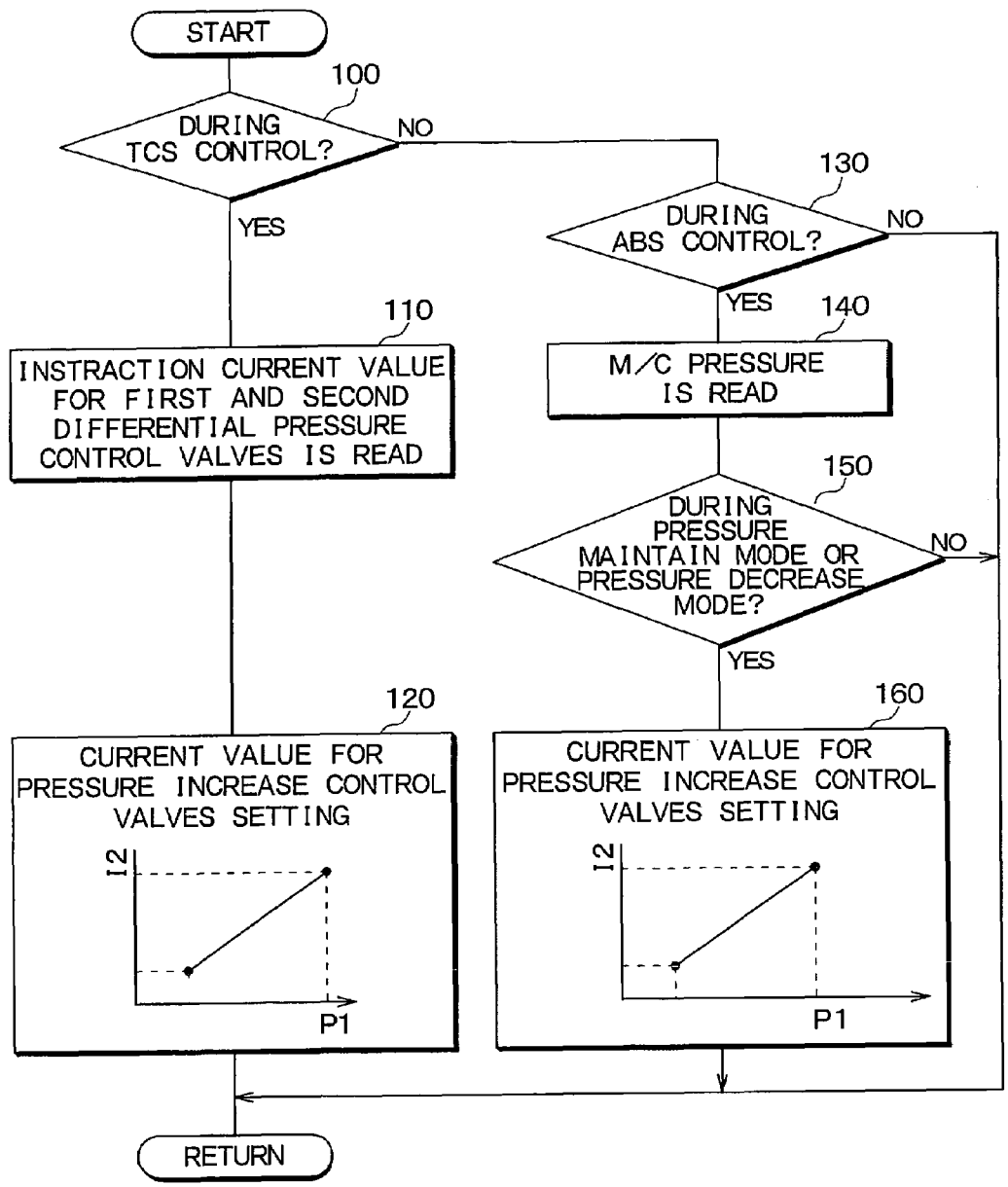
FIG. 2 is a flowchart of a routine executed by a brake control ECU provided in the vehicular brake control system shown in FIG. 1.

FIG. 2 is a flowchart illustrating a routine executed by the brake control ECU 4 in the vehicular brake control system 1 according to this embodiment. The routine shown in the drawing is executed together with routines for various general controls that are executed by the brake control ECU 4 when an ignition switch, not shown, provided in the vehicle is turned on.

First, at 100, it is determined whether TCS control is currently being executed. This determination is made, for example, based on whether a TCS control operation flag, which is set when conditions to start TCS control have been satisfied, is set in a TCS control routine executed by the brake control ECU 4 or an engine ECU, not shown. This TCS control routine is typically well known so a description thereof will be omitted here.

If the determination is YES at 100, the routine proceeds to the processing at 110, where an instruction current value for the first and second differential pressure control valves 16 and 36 is read. The technical term "instruction current value for the first and second differential pressure control valves 16 and 36" as used here refers to a value of a current that is supplied from the brake control ECU 4 to the solenoids for driving the first and second differential pressure control valves 16 and 36. During TCS control, the brake control ECU 4 determines the degree of differential pressure that must be generated by the first and second differential pressure control valves 16 and 36, and also obtains the instruction current value necessary for generating that differential pressure. Thus, this processing is executed by reading this value.

The routine then proceeds to the processing at 120. Here, current value setting processing is performed to set the current value for the pressure increase control valves 17, 18, 37 and 38. This processing sets the value of the current to be supplied to the solenoid coils of the second and fourth pressure increase control valves 18 and 38 corresponding to the W/C 15 and 35 of the non-driven wheels, i.e., the rear left and right wheels RL and RR, which are not the subject of TCS control.

More specifically, a map defining the relationship between an instruction current I1 read at 110 and a value I2 of a current to be supplied to the solenoid coils of the second and fourth pressure increase control valves 18 and 38 is set and stored in the brake control ECU 4. The value I2 of the current to be supplied to the solenoid coils is then obtained based on this map.

Here, the size of the instruction current value I1 supplied to the first and second differential pressure control valves 16 and 36 corresponds to the amount of differential pressure to be generated by the first and second differential pressure control valves 16 and 36. The greater the instruction current I1, the greater the generated differential pressure becomes. Because the brake fluid pressure applied to the second and fourth pressure increase control valves 18 and 38 becomes greater as the generated differential pressure increases, the value I2 of the current to be supplied to the solenoid coils must be set such that the second and fourth pressure increase control valves 18 and 38 can withstand that brake fluid pressure. In this embodiment, therefore, the map is set such that the value I2 of the current to be supplied to the solenoid coils of the second and fourth pressure increase control valves 18 and 38 becomes proportionately larger, the greater the instruction current value I1.

If, on the other hand, the determination at 100 is NO, the routine proceeds to 130, where it is determined whether ABS control is currently being executed. This determination is made, for example, based on whether an ABS control operation flag, which is set when conditions to start ABS control have been satisfied, is set in an ABS control routine executed by the brake control ECU 4. This ABS control routine is typically well known so a description thereof will be omitted here.

If the determination at 130 is YES, the routine proceeds to the processing at 140. If, on the other hand, the determination at 130 is NO, it is determined that no current is being supplied to any of the first to the fourth pressure increase control valves 17, 18, 37, and 38, and this cycle of the routine directly ends.

At 140, an M/C pressure P1 is read. This M/C pressure P1 is read by reading a detection signal from the pressure sensor 70.

The routine next proceeds to the processing at 150, where it is determined whether a pressure maintain mode or a pressure decrease mode is set in ABS control. This determination is made, for example, based on setting of a flag which indicates that the pressure maintain mode or the pressure decrease mode is set in an ABS control routine executed by the brake control ECU 4. This routine is included in a typical ABS control routine so a description thereof will be omitted here.

If the determination at 150 is YES, the routine proceeds to the processing at 160. If, on the other hand, the determination at 150 is NO, it is determined that the ABS control routine is currently being executed but no current is being supplied to any of the first to the fourth pressure increase control valves 17, 18, 37, and 38, and this cycle of the routine directly ends.

At 160, current value setting processing to set the current value for the pressure increase control valves 17, 18, 37 and 38 is executed, just as it is at 120. This processing, for example, sets the value of the current to be supplied to the solenoid coil of the fourth pressure increase control valve 38 corresponding to the W/C 35 of the rear left wheel RL which has been set to the pressure maintain mode or the pressure decrease mode in ABS control.

More specifically, a map defining the relationship between the M/C pressure P1 read at 140 and the value I2 of a current to be supplied to the solenoid coil of the fourth pressure increase control valve 38 corresponding to the rear left wheel RL, which has been set to the pressure maintain mode or the pressure decrease mode in ABS control, is set and stored in the brake control ECU 4. The value I2 of the current to be supplied to the solenoid coil is then obtained based on this map.

Here, the M/C pressure P1 corresponds to the brake fluid pressure applied to the fourth pressure increase control valve 38 corresponding to the rear left wheel RL which has been set to the pressure maintain mode or the pressure decrease mode in ABS control. Therefore, because the M/C pressure P1 becomes larger as the brake fluid pressure applied to the fourth pressure increase control valve 38 becomes greater, the value I2 of the current to be supplied to the solenoid coil must be set such that the fourth pressure increase control valve 38 can withstand that brake fluid pressure. In this embodiment, therefore, the map is set such that the value I2 of the current to be supplied to the solenoid coil of the fourth pressure increase control valve 38 becomes proportionately larger the greater the M/C pressure P1.

As described above, the value I2 of the current to be supplied to the solenoid coils of the first to the fourth pressure increase control valves 17, 18, 37, and 38 is set during TCS control and ABS control. The following analysis can be given concerning the value I2 of the current to be supplied to the solenoid coils of the first to the fourth pressure increase control valves 17, 18, 37, and 38.

Figure 3A:
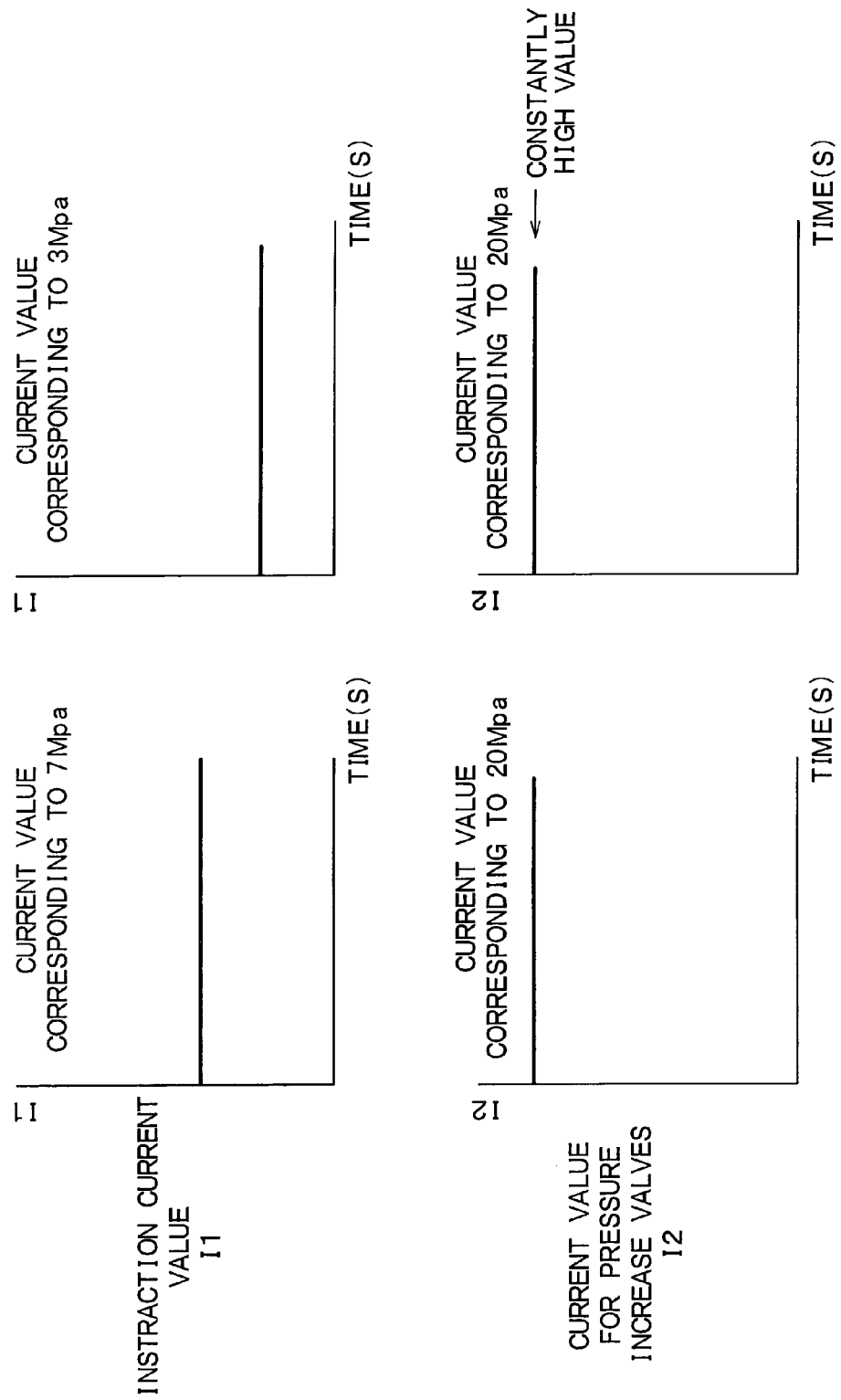
FIG. 3A is a graph showing the relationship between an instruction current value I1 for a differential pressure control valve and a value of a current I2 supplied to a solenoid coil of a pressure increase control valve during TCS control according to related art.
Figure 3B:
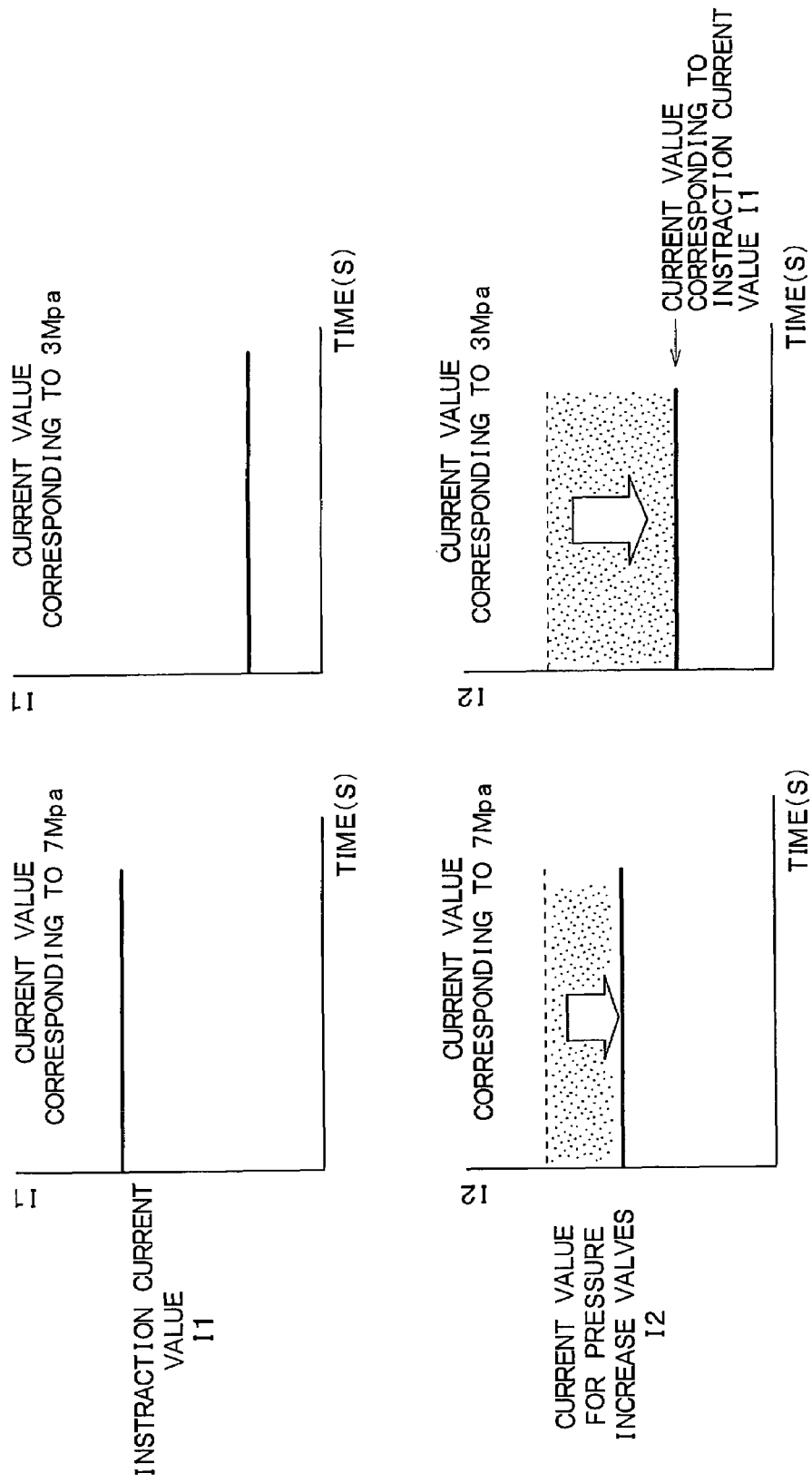
FIG. 3B is a graph showing the relationship between the instruction current value I1 for the differential pressure control valve and the value of the current I2 supplied to the solenoid coil of the pressure increase control valve during TCS control according to the first embodiment of the present invention.

FIGS. 3A and 3B are graphs showing the relationship between the value I2 of the current to be supplied to the solenoid coils of the first to the fourth pressure increase control valves 17, 18, 37, and 38 and the instruction current value I1 for the first and second differential pressure control valves 16 and 36 during TCS control. FIG. 3A shows a case with the related art and FIG. 3B shows a case with the present embodiment.

In FIGS. 3A and 3B, the instruction current value I1 of the first and second differential pressure control valves 16 and 36 corresponds to the differential pressure generated by the first and second differential pressure control valves 16 and 36. Therefore, a W/C pressure according to this instruction current value I1 is generated. For example, the size of the instruction current value I1 also changes when a W/C pressure of 7 MPa is generated as compared to when a W/C pressure of 3 MPa is generated, as shown in FIGS. 3A and 3B.

In contrast, with the example of the related art shown in FIG. 3A, the value I2 of the current supplied to the solenoid coils of the second and fourth pressure increase control valves 18 and 38 corresponding to the W/Cs 15 and 35 of the rear left and right wheels RL and RR, which are the non-driven wheels, is the same irrespective of the size of the instruction current value I1. Accordingly, more electricity than is necessary is consumed, as described above.

On the other hand, with the present embodiment shown in FIG. 3B, the value I2 of the current supplied to the solenoid coils of the second and fourth pressure increase control valves 18 and 38 corresponding to the W/C 15 and 35 of the rear left and right wheels RL and RR, which are the non-driven wheels, changes depending on the size of the instruction current value I1.

Therefore, during TCS control, since no more unnecessary current is supplied to the solenoid coils of the second and fourth pressure increase control valves 18 and 38 corresponding to the W/C 15 and 35 of the rear left and right wheels RL and RR, which are the non-driven wheels, the amount of current consumption can be reduced. Further, because unnecessary current consumption can be reduced in this way, it is possible to inhibit excess heat from being generated by the IC in the brake control ECU 4 and the solenoid coil.

Similarly, when the pressure is to be maintained or decreased in ABS control as well, no more unnecessary current is supplied to the solenoid coil of the fourth pressure increase control valve 38 corresponding to the rear left wheel RL which has been set to the pressure maintain mode or pressure decrease mode in the ABS control. Accordingly, in this case as well, the amount of current consumption can be reduced, thus enabling an effect similar to that obtained with TCS control to be obtained.

In this way, with this embodiment, in the vehicular brake control system 1 in which the pressure upstream of the first to the fourth pressure increase control valves 17, 18, 37, and 38 can be varied, the brake control ECU 4 obtains a physical quantity, i.e., the instruction current value I1 or the M/C pressure P1, according to the brake fluid pressure upstream of the first to the fourth pressure increase control valves 17, 18, 37, and 38. The value I2 of the current supplied to the solenoid coils provided in each of the first to the fourth pressure increase control valves 17, 18, 37, and 38 is then set according to this physical quantity.

Thus, it is possible to make the value I2 of the current supplied to the solenoid coils provided in each of the first to the fourth pressure increase control valves 17, 18, 37, and 38 a value that is no larger than necessary, which enables the amount of current consumption to be reduced. Further, because unnecessary current consumption can be reduced in this way, it is possible to inhibit excess heat from being generated by the IC in the brake control ECU 4 and the solenoid coil.

One method that may be employed to change the value I2 of the current supplied to the solenoid coils provided in the first to the fourth pressure increase control valves 17, 18, 37, and 38 as described above is to have the value of the current that is to be output to the solenoid coils vary. Another method that may be employed is to fix the amount of current to be output to the solenoid coils while the average value of the current value per unit time is varied by performing duty control on the fixed current.

When duty control is performed on the current output to the solenoid coils in this way, duty modulation noise may be produced by the solenoid coils or the brake control ECU 4 that outputs the current to the solenoid coils. However, the value I2 of the current supplied to the solenoid coils can be set to the minimum necessary value (i) in accordance with the instruction current value I1 for the first and second differential pressure control valves 16 and 36 during TCS control, and (ii) in accordance with the M/C pressure P1 during ABS control. Hence, this duty modulation noise can also be reduced according to the current supplied to the solenoid coils.

Other Embodiments

In the foregoing embodiment, the value I2 of the current supplied to the solenoid coils of the second and fourth pressure increase control valves 18 and 38 corresponding to the W/C 15 and 35 of the rear left and right wheels RL and RR, which are the non-driven wheels, is primarily determined to be a fixed value according to the instruction current value I1 for the first and second differential pressure control valves 16 and 36 during TCS control. However, the value I2 of the current supplied to the solenoid coils does not always have to be a fixed value.

For example, when TCS control is executed, the brake control ECU 4 may calculate the W/C pressure to be generated based on acceleration slip information from a wheel acceleration sensor, and operate the pumps 19 and 39 to generate that W/C pressure. At this time, because there is a time lag in the brake fluid pressure increase from the pumps 19 and 39, the value I2 of the current supplied to the solenoid coils of the second and fourth pressure increase control valves 18 and 38 corresponding to the W/Cs 15 and 35 of the rear left and right wheels RL and RR, which are the non-driven wheels, may be set taking that time lag into consideration.

Figure 4:
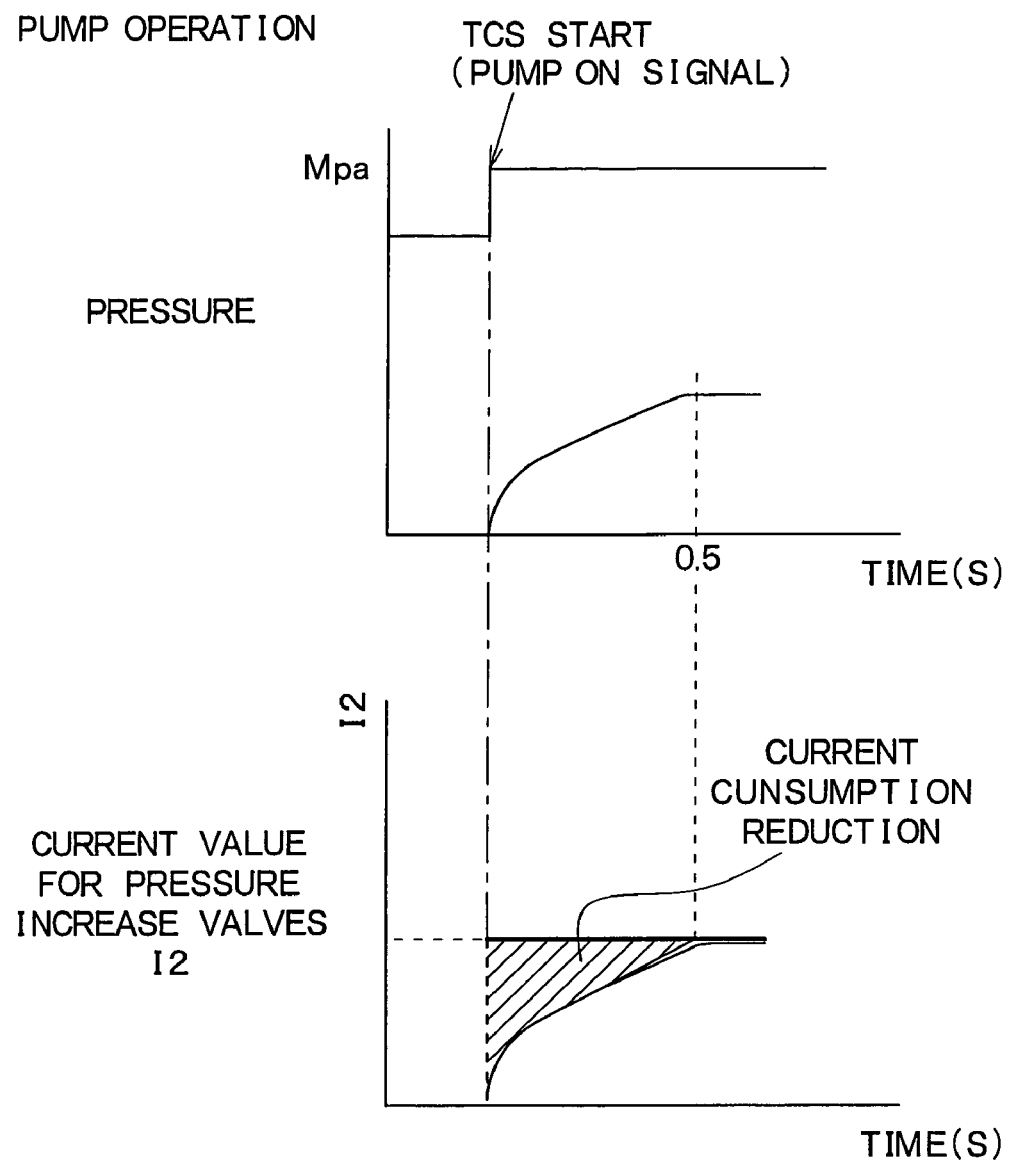
FIG. 4 is a graph showing the relationship between the value of the current I2 supplied to the solenoid coil and an increase in W/C pressure following activation of a pump.

FIG. 4 is a graph showing the relationship between the increase in the W/C pressure resulting from pump operation and the value I2 of the current supplied to the solenoid coils.

As shown in this drawing, it takes a time period of 0.5 [s], for example, for the pumps 19 and 39 to increase the W/C pressure to the pressure necessary for TCS control. It is therefore possible to gradually increase the value I2 of the current supplied to the solenoid coils for that time period, and at the end of the time period it is a value that corresponds to the instruction current value I1 for the first and second differential pressure control valves 16 and 36.

Accordingly, unnecessary current consumption can be further suppressed, thus further enhancing the foregoing effects.

Also, the foregoing embodiment describes a case in which the vehicular brake control system 1 according to one embodiment of the present invention is mounted in a front wheel drive vehicle. Alternatively, however, it is also possible to mount the vehicular brake control system 1 in a rear wheel drive vehicle, as was described above. Moreover, it is also possible to apply to a four wheel drive vehicle the structure in which, when the pressure is to be maintained or decreased in ABS control, the value I2 of the current (which is supplied to the solenoid coils corresponding to the first to the fourth pressure increase control valves 17, 18, 37, and 38 that have been set to the pressure maintain mode or the pressure decrease mode) is changed according to the M/C pressure P1.

Further, the foregoing embodiment describes a case that referred to TCS control and ABS control. With electronic stability control, that is, side slip prevention control as well, however, it is also possible to stop brake fluid pressure from being applied to the pressure increase control valves corresponding to wheels other than those subject to the control. Therefore, by adjusting the current value I2 supplied to the solenoid coils of the pressure increase control valves, it is possible to obtain effects similar to those obtained by the embodiment described above.

Furthermore, in the foregoing embodiment, the instruction current value I1 and the M/C pressure P1 are used as physical quantities corresponding to the brake fluid pressure upstream of the first to the fourth pressure increase control valves 17, 18, 37, and 38. Alternatively, however, other physical quantities may also be used.

Note that, each process shown in the drawings corresponds to a portion which executes that process.

While the above description is of the preferred embodiments of the present invention, it should be appreciated that the invention may be modified, altered, or varied without deviating from the scope and fair meaning of the following claims.

What is claimed is:

1. A vehicular brake control system comprising:
 a master cylinder for generating brake fluid pressure based on an operation of a brake operating member by a driver;
 a plurality of wheel cylinders for generating braking force based on the brake fluid pressure generated by the master cylinder;
 main brake conduits for connecting the master cylinder with the plurality of wheel cylinders;
 a plurality of pressure increase control valves, a respective one of the plurality of pressure increase control valves provided for a respective one of the plurality of wheel cylinders in the main brake conduits, the plurality of pressure increase control valves controlling the brake fluid pressure applied to the plurality of wheel cylinders;
 pressure decrease conduits provided corresponding to the plurality of wheel cylinders and which are connected between the plurality of wheel cylinders and the plurality of pressure increase control valves in the main brake conduits;
auxiliary brake conduits for supplying brake fluid;
reservoirs which are connected to the auxiliary brake conduits and the pressure decrease conduits;
a plurality of pressure decrease control valves provided in each of the pressure decrease conduits;
recirculation conduits for connecting a portion between the reservoirs and the plurality of pressure decrease control valves in the pressure decrease conduits, and a portion between the plurality of pressure increase control valves and the master cylinder in the main brake conduits;
pumps provided in the recirculation conduits, which recirculate brake fluid stored in the reservoirs to the main brake conduits;
a motor for driving the pumps;
differential pressure control valves provided between the master cylinder and points where the recirculation conduits are connected in the main brake conduits; and
a control portion which controls a current supplied to the motor and also controls a current supplied to a solenoid coil provided in each of the differential pressure control valves, the plurality of pressure increase control valves, and the plurality of pressure decrease control valves in order to drive each of these valves, wherein
the control portion supplies a current to the motor and the solenoid coils of the differential pressure control valves during TCS control so as to create a differential pressure between the brake fluid pressure on the master cylinder side and the brake fluid pressure on the wheel cylinder side while suppressing the driving force by driving the pumps and applying brake fluid pressure to the wheel cylinders among the plurality of wheel cylinders that correspond to driven wheels, and
during this TCS control, the control portion sets, according to an instruction current value indicating a value of the current supplied to the differential pressure control valves, a value of the current supplied to the solenoid coils of the pressure increase control valves among the plurality of pressure increase control valves that are used to control the brake fluid pressure of the plurality of wheel cylinders corresponding to non-driven wheels.

2. The vehicular brake control system according to claim 1, wherein the control portion sets the value of the current supplied to the solenoid coils according to a time lag in the brake fluid pressure increase generated by the pumps during the traction control.

3. The vehicular brake control system according to claim 2, wherein the control portion sets the value of the current supplied to the solenoid coils to be lower during the duration of the time lag in the brake fluid pressure increase generated by the pumps than after complete elapse of the duration.

4. The vehicular brake control system according to claim 1, further comprising:
a pressure sensor which detects a brake fluid pressure on an upstream side of the plurality of pressure increase control valves, wherein
during ABS control, the control portion controls the brake fluid pressure applied to the wheel cylinders of the wheels to be controlled by driving the plurality of pressure increase control valves and the plurality of pressure decrease control valves corresponding to the wheel cylinders, from among the plurality of wheel cylinders, for the wheels to be controlled, and when the pressure is to be decreased or maintained during the ABS control, the control portion sets the value of the current supplied to the solenoid coils of the pressure increase control valves corresponding to the wheel cylinders of the wheels to be controlled in accordance with a detection result from the pressure sensor.

5. The vehicular brake control system according to claim 4, wherein the control portion sets the value of the current supplied to the solenoid coils to be lower as the pressure detected by the pressure sensor becomes lower.

6. The vehicular brake control system according to claim 1, wherein the value of the current supplied to the solenoid coils is adjusted by supplying a current of a fixed value to the solenoid coils and varying the average value of the total current value per unit time by performing duty control for the time for which that current is supplied.

* * * * *